(12) United States Patent
Luo et al.

(10) Patent No.: US 11,909,324 B2
(45) Date of Patent: Feb. 20, 2024

(54) TRANS-INDUCTOR VOLTAGE REGULATOR USING A NONLINEAR COMPENSATION INDUCTOR

(71) Applicant: Dell Products L.P., Round Rock, TX (US)

(72) Inventors: Shiguo Luo, Austin, TX (US); Wickman Wu, Taipei (TW); Guangyong Zhu, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 65 days.

(21) Appl. No.: 17/836,484

(22) Filed: Jun. 9, 2022

(65) Prior Publication Data

US 2023/0402931 A1 Dec. 14, 2023

(51) Int. Cl.
*H02M 3/335* (2006.01)
*H02M 1/00* (2006.01)
*G05F 1/32* (2006.01)

(52) U.S. Cl.
CPC .......... *H02M 3/33576* (2013.01); *G05F 1/32* (2013.01); *H02M 1/0009* (2021.05); *H02M 3/335* (2013.01); *H02M 3/33507* (2013.01)

(58) Field of Classification Search
CPC ..................... H02M 3/335; H02M 3/33507
See application file for complete search history.

(56) References Cited

U.S. PATENT DOCUMENTS

| | | | |
|---|---|---|---|
| 7,791,321 B2 | 9/2010 | Xu et al. | |
| 9,627,125 B2* | 4/2017 | Ikriannikov | G05F 1/33 |
| 11,303,204 B1 | 4/2022 | Zhao et al. | |
| 2006/0006849 A1* | 1/2006 | Haslett | H03H 11/48 323/247 |
| 2019/0109543 A1* | 4/2019 | Adragna | H02M 3/01 |

* cited by examiner

*Primary Examiner* — Gary A Nash
(74) *Attorney, Agent, or Firm* — Larson Newman, LLP

(57) ABSTRACT

A trans-inductor voltage regulator (TLVR) includes at least two voltage converter phases configured to receive a common input voltage and to provide an output voltage on an output of the voltage converter, an associated coupled inductor, and a compensation inductor. Each coupled inductor includes a primary winding magnetically coupled to a secondary winding. For each primary winding, a first terminal is coupled to the output of the associated voltage converter, and a second terminal of the primary winding is coupled to a load. A first terminal of the compensation inductor is coupled to a ground plane, and each secondary winding is coupled in series with the compensation inductor, with a last secondary being coupled to the ground plane. The compensation inductor is a nonlinear inductor exhibiting a first inductance level at a first current level, and a second inductance level different from the first inductance level at a second current level different from the first current level.

20 Claims, 4 Drawing Sheets

TRANS-INDUCTOR VOLTAGE REGULATOR USING A NONLINEAR COMPENSATION INDUCTOR

FIELD OF THE DISCLOSURE

This disclosure generally relates to information handling systems, and more particularly relates to providing a trans-inductor voltage regulator that uses a nonlinear compensation inductor.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

A trans-inductor voltage regulator may include at least two voltage converter phases configured to receive a common input voltage and to provide an output voltage on an output of the voltage converter, and an associated coupled inductor. Each coupled inductor may include a primary winding magnetically coupled to a secondary winding. For each primary winding, a first terminal may be coupled to the output of the associated voltage converter, and a second terminal of the primary winding may be coupled to a load. A first terminal of a compensation inductor may be coupled to a ground plane, and each secondary winding may be coupled in series with the compensation inductor, with a last secondary being coupled to the ground plane.

The compensation inductor may be a nonlinear inductor exhibiting a first inductance level at a first current level, and a second inductance level different from the first inductance level at a second current level different from the first current level.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
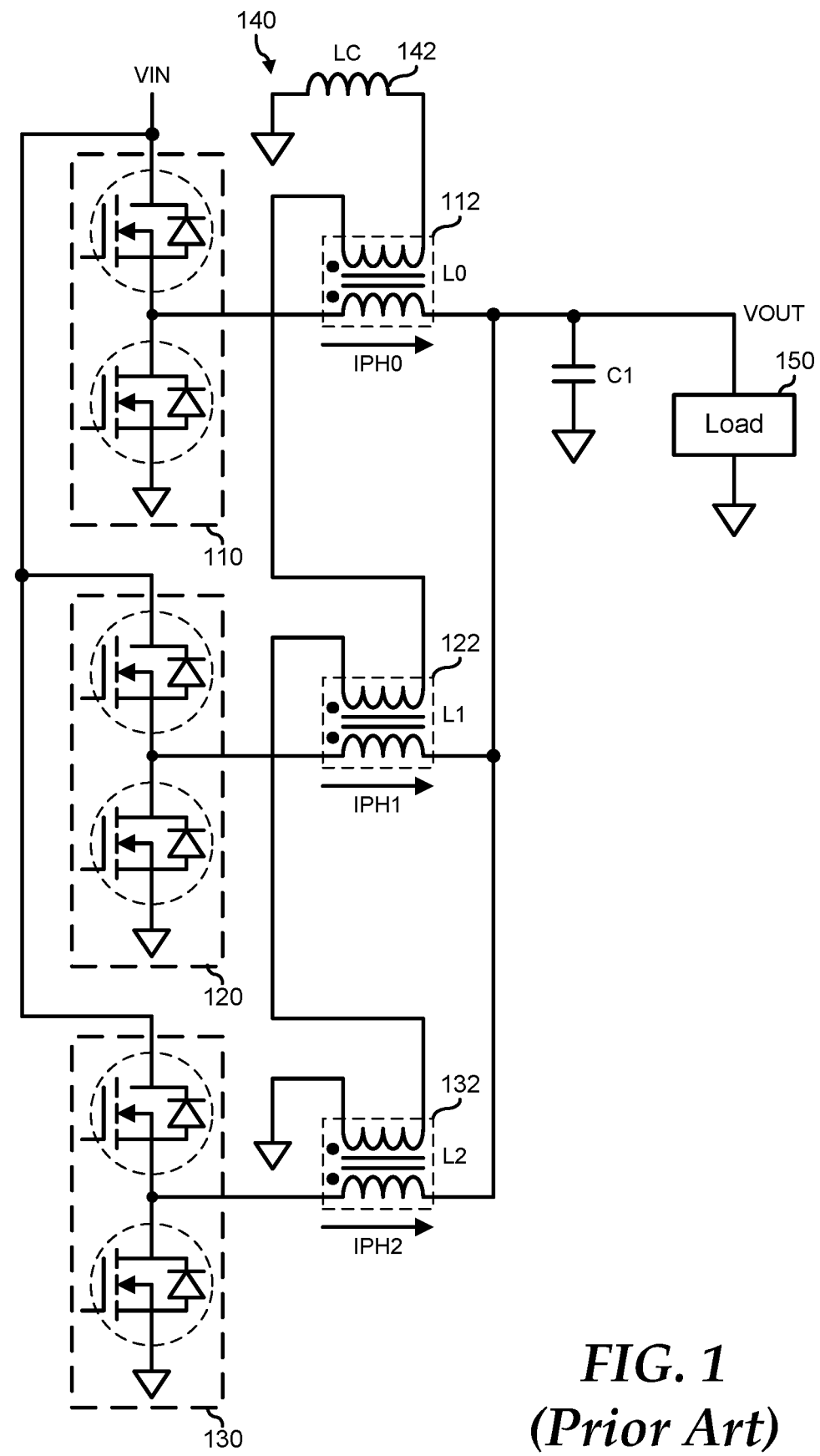
FIG. 1 is a block diagram of a conventional trans-inductor voltage regulator according to the prior art.

FIG. 1 illustrates a trans-inductor voltage regulator (TLVR) 100 as may be known in the art. TLVR 100 is a three-phase voltage regulator including converter phases 110, 120, and 130, and a trans-inductance circuit 140. TLVR 100 is configured to receive input power at an input voltage (VIN) and to convert the voltage level of the input voltage (VIN) to an output voltage level of an output voltage (VOUT) to power a load 150. Converter phases 110, 120, and 130 each receive the input voltage (VIN) and provide an output current to load 150. In a voltage regulator without a trans-inductance circuit, each converter phase provides its current through an associated inductor, and a bulk capacitor C1, in order to reduce switching transients in the output voltage level (VOUT). Trans-inductance circuit 140 is provided which includes compensation inductor 142, and tightly coupled inductor 112, 122, and 132, each associated with a respective converter phase 110, 120, and 130. In particular, converter phase 110 provides its output current (IPH0) through a primary winding of inductor phase 112, converter phase 120 provides its output current (IPH1) through a primary winding of inductor phase 122, and converter phase 130 provides its output current (IPH2) through a primary winding of inductor phase 132. In a particular embodiment, coupled inductors 112, 122, and 130 provide a coupling coefficient of 0.95 or greater.

Trans-inductance circuit 140 is configured such that a first terminal of compensation inductor 142 is connected to ground, a second terminal of the compensation inductor is connected to a first terminal of a secondary winding of coupled inductor 112, a second terminal of the secondary winding of coupled inductor 112 is connected to a first terminal of a secondary winding of coupled inductor 122, a second terminal of the secondary winding of coupled inductor 122 is connected to a first terminal of a secondary winding of coupled inductor 132, and a second terminal of the secondary winding of coupled inductor 132 is connected to ground to complete the circuit. In a particular embodiment, compensation inductor 142 has an inductance of 150 nanoHenries (nH), and coupled inductors 112, 122, and 132 have matched primary and secondary windings of 200 nH.

In other embodiments, compensation inductor 142 and the primary and secondary windings of coupled inductors 112, 122, and 132 may be provided in the range of 50-1000 nH, as needed or desired to meet the overall power requirements of TLVR 100. Moreover, the primary and secondary windings of coupled inductors 112, 122, and 132 may have mis-matched values as needed or desired to meet the overall power requirements of TLVR 100. With the inclusion of trans-inductance circuit 140, TLVR 100 is characterized as having an extremely fast dynamic response. Such a high dynamic response may be required in response to the increasing requirements imposed by various processor manufacturers for their associated processors.

Typical TLVRs such as TLVR 100 utilize dynamic phase shedding which allows for one or more converter phase to halt operation in low load demand situations to reduce power loss and to increase power conversion efficiency. However, due to the magnetic coupling in a TLVR converter, the shed converter phases will still provide a non-zero current to the load, making it difficult for the voltage regulator controller to process the reported phase current information (IMON) correctly and accurately. A possible solution is to properly design the compensation inductor to minimize the average current in the shed converter phases, for example, by providing a compensation inductor with a large inductance to generate a smaller average current in outputs of the shed converter phases, resulting in a smaller IMON reporting error. However, providing the compensation inductor with a large inductance slows down the load transient response of the TLVR, thereby negating the motivation for providing the trans-inductance circuit in the first place.

Further, even when a trans-inductance circuit include a compensation inductor with a low inductance, the TLVR may have a larger steady state current ripple because of the magnetic coupling from other converter phases, resulting in lower efficiency due to higher switching losses, higher inductor core losses, and winding AC losses. Therefore, a trans-inductance voltage regulator with a compensation inductor that exhibits a high inductance in steady state operation for small current ripple and small current reporting error, but that exhibits a low inductance during transient operation to provide a fast response time would be desirable.

Figure 2:
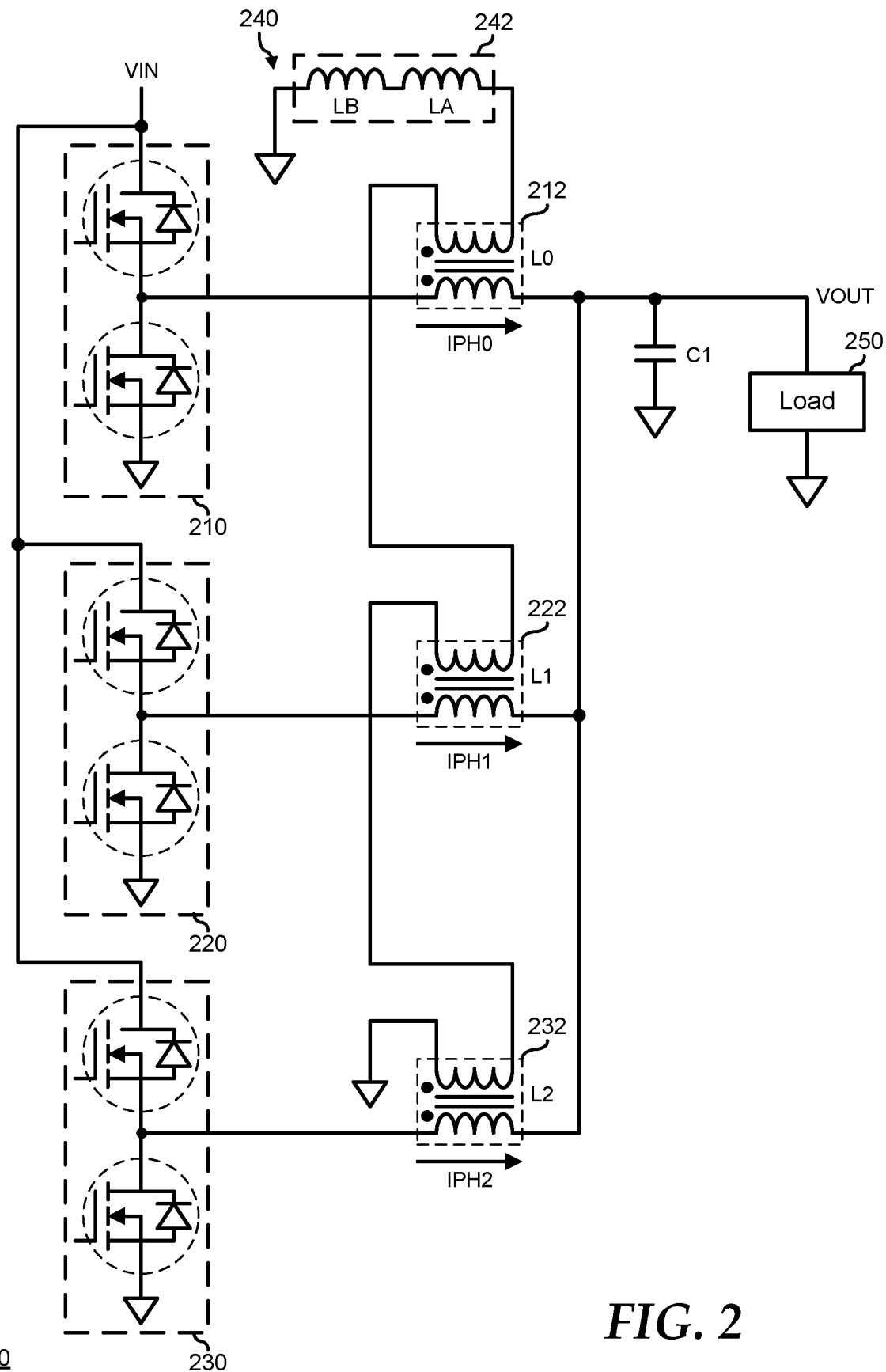
FIG. 2 is a block diagram of a trans-inductor voltage regulator according to an embodiment of the current disclosure.

FIG. 2 illustrates a TLVR 200 according to an embodiment of the current disclosure. TLVR 200 is a three-phase voltage regulator including converter phases 210, 220, and 230, and a trans-inductance circuit 240. TLVR 200 is configured to receive input power at an input voltage (VIN) and to convert the voltage level of the input voltage (VIN) to an output voltage level of an output voltage (VOUT) to power a load 250. Converter phases 210, 220, and 230 each receive the input voltage (VIN) and provide an output current to load 250. Trans-inductance circuit 240 includes compensation inductor 242, and tightly coupled coupled inductors 212, 222, and 232, each associated with a respective converter phase 210, 220, and 230. In particular, converter phase 210 provides its output current (IPH0) through a primary winding of inductor phase 212, converter phase 220 provides its output current (IPH1) through a primary winding of inductor phase 222, and converter phase 230 provides its output current (IPH2) through a primary winding of inductor phase 232. In a particular embodiment, coupled inductors 212, 222, and 230 provide a coupling coefficient of 0.95 or greater.

Trans-inductance circuit 240 is configured such that a first terminal of compensation inductor 242 is connected to ground, a second terminal of the compensation inductor is connected to a first terminal of a secondary winding of coupled inductor 212, a second terminal of the secondary winding of coupled inductor 212 is connected to a first terminal of a secondary winding of coupled inductor 222, a second terminal of the secondary winding of coupled inductor 222 is connected to a first terminal of a secondary winding of coupled inductor 232, and a second terminal of the secondary winding of coupled inductor 232 is connected to ground to complete the circuit. In a particular embodiment, compensation inductor 242 has an initial inductance of 600 nH, and coupled inductors 212, 222, and 232 have matched primary and secondary windings of 200 nH.

In other embodiments, compensation inductor 242 and the primary and secondary windings of coupled inductors 212, 222, and 232 may be provided in the range of 50-1000 nH, as needed or desired to meet the overall power requirements of TLVR 200. Moreover, the primary and secondary windings of coupled inductors 212, 222, and 232 may have mis-matched values as needed or desired to meet the overall power requirements of TLVR 200. With the inclusion of trans-inductance circuit 240, the output currents IPH0, IPH1, and IPH2 from respective converter phases 210, 220, and 230 are coupled together, and any increase in the current demanded by load 250 is quickly provided by all of the converter phases simultaneously. Likewise, any decrease in the current demanded by load 250 is quickly reduced by all of the converter phases simultaneously. As such, TLVR 200 is characterized as having an extremely fast dynamic response.

Compensation inductor 242 represents a nonlinear inductor configured to exhibit varying inductance characteristics depending upon the current being conducted through the compensation inductor. Here, compensation inductor 242 will exhibit a high inductance at low current levels to improve IMON signal accuracy, and to reduce the current ripple and improve converter efficiency. Further, compensation inductor 242 will exhibit a low inductance at higher current levels to improve transient performance. In a particular embodiment, the high inductance level for compensation inductor 242 may be 600 nH and have a saturation current level (Isat-A) of around 3 amps (A), and a low inductance level may be 150 nH through the expected operating current level of voltage regulator 200. In a particular embodiment, the saturation current level for the high inductance level (Isat-A) may be larger than one-half of the peak-to-peak ripple amplitude in the steady state of trans-inductance circuit 240, and the saturation current level for the low inductance level (Isat-B) may be larger than the peak current in the trans-inductance circuit in a worst-case transient event.

Figure 3:
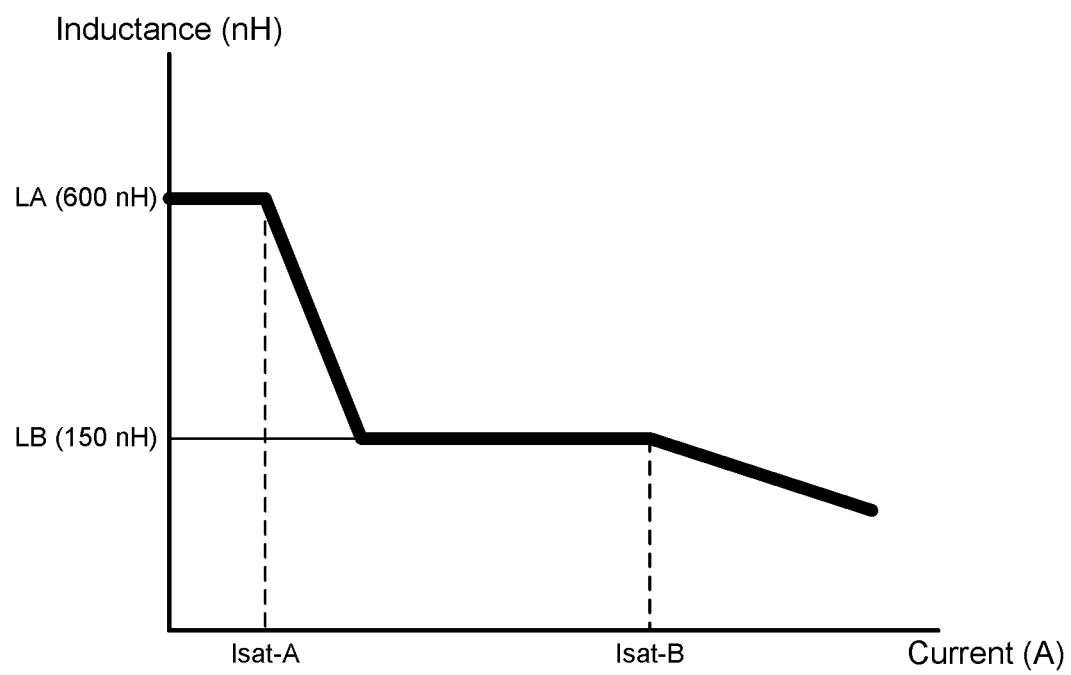
FIG. 3 is an inductance versus current curve for a nonlinear inductor according to embodiment the trans-inductor voltage regulator of FIG. 2.

FIG. 3 illustrates an embodiment of compensation inductor 242. In a particular embodiment, compensation inductor 242 represents a single inductor device such as an inductor with a nonlinear, or devised, core due to the magnetic properties of the core, non-uniformity of the core material, different core dimensions, or the like. Here, compensation inductor 242 may be fabricated with two air gaps on a single ferrite core, with the air gaps sized as determined by the desired saturation current levels. In another embodiment, compensation inductor 242 represents individual inductors (LA and LB) in series that provide the features of the equivalent compensation inductor (LC). Here, the individual inductors may have a common core material or may have different core materials. Here further, the individual inductor saturation currents may be different (that is, Isat-A for LA, and Isat-B for LB).

Figure 4:
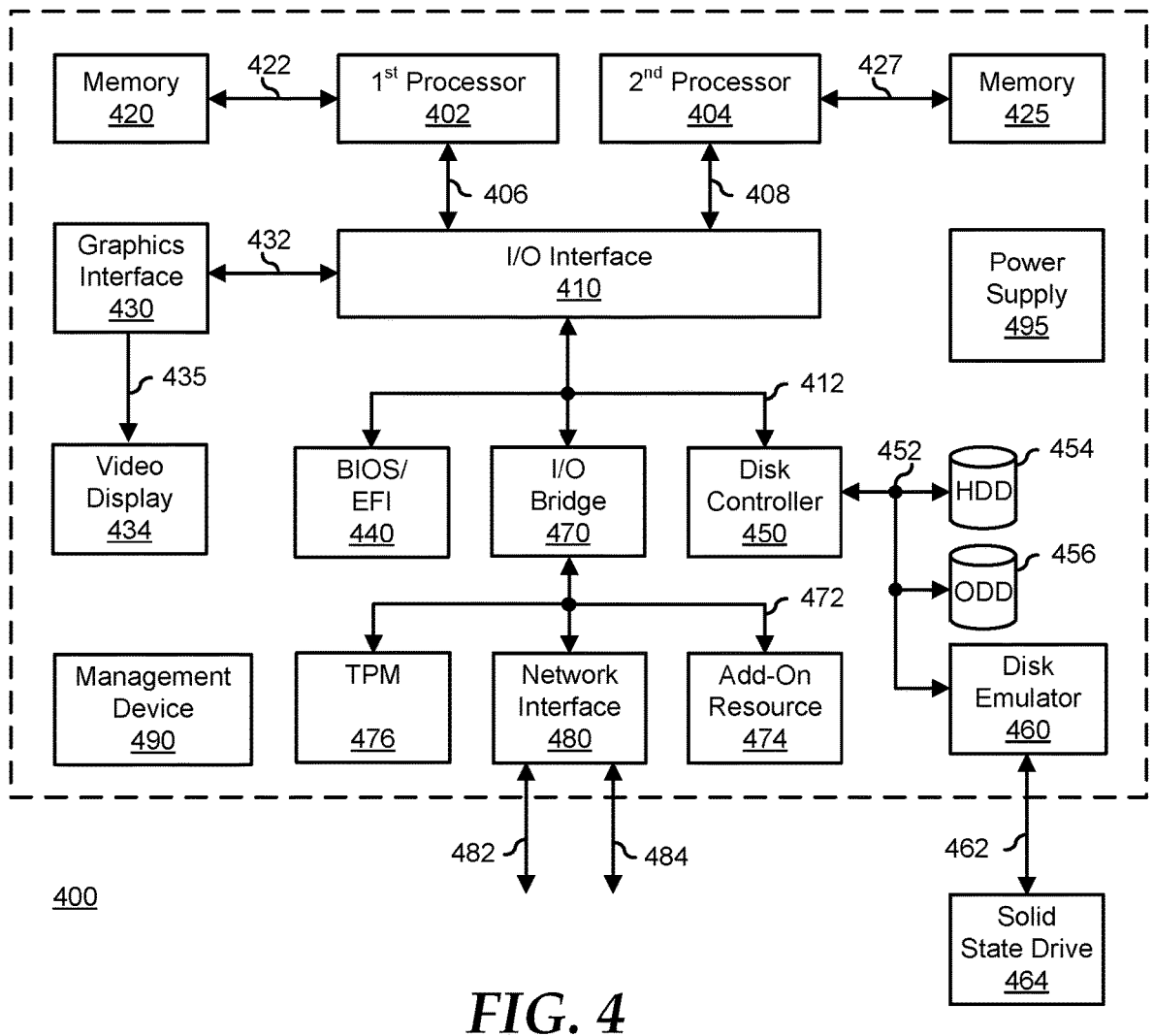
FIG. 4 is a block diagram illustrating a generalized information handling system according to another embodiment of the present disclosure.

FIG. 4 illustrates a generalized embodiment of an information handling system 400. For purpose of this disclosure an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 400 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 400 can include processing resources for executing machine-executable code, such as a central processing unit (CPU), a programmable logic array (PLA), an embedded device such as a System-on-a-Chip (SoC), or other control logic hardware.

Information handling system 400 can also include one or more computer-readable medium for storing machine-executable code, such as software or data. Additional components of information handling system 400 can include one or more storage devices that can store machine-executable code, one or more communications ports for communicating with external devices, and various input and output (I/O) devices, such as a keyboard, a mouse, and a video display. Information handling system 400 can also include one or more buses operable to transmit information between the various hardware components.

Information handling system 400 can include devices or modules that embody one or more of the devices or modules described below, and operates to perform one or more of the methods described below. Information handling system 400 includes a processors 402 and 404, an input/output (I/O) interface 410, memories 420 and 425, a graphics interface 430, a basic input and output system/universal extensible firmware interface (BIOS/UEFI) module 440, a disk controller 450, a hard disk drive (HDD) 454, an optical disk drive (ODD) 456, a disk emulator 460 connected to an external solid state drive (SSD) 462, an I/O bridge 470, one or more add-on resources 474, a trusted platform module (TPM) 476, a network interface 480, a management device 490, and a power supply 495. Processors 402 and 404, I/O interface 410, memory 420, graphics interface 430, BIOS/UEFI module 440, disk controller 450, HDD 454, ODD 456, disk emulator 460, SSD 462, I/O bridge 470, add-on resources 474, TPM 476, and network interface 480 operate together to provide a host environment of information handling system 400 that operates to provide the data processing functionality of the information handling system. The host environment operates to execute machine-executable code, including platform BIOS/UEFI code, device firmware, operating system code, applications, programs, and the like, to perform the data processing tasks associated with information handling system 400.

In the host environment, processor 402 is connected to I/O interface 410 via processor interface 406, and processor 404 is connected to the I/O interface via processor interface 408. Memory 420 is connected to processor 402 via a memory interface 422. Memory 425 is connected to processor 404 via a memory interface 427. Graphics interface 430 is connected to I/O interface 410 via a graphics interface 432, and provides a video display output 436 to a video display 434. In a particular embodiment, information handling system 400 includes separate memories that are dedicated to each of processors 402 and 404 via separate memory interfaces. An example of memories 420 and 430 include random access memory (RAM) such as static RAM (SRAM), dynamic RAM (DRAM), non-volatile RAM (NV-RAM), or the like, read only memory (ROM), another type of memory, or a combination thereof.

BIOS/UEFI module 440, disk controller 450, and I/O bridge 470 are connected to I/O interface 410 via an I/O channel 412. An example of I/O channel 412 includes a Peripheral Component Interconnect (PCI) interface, a PCI-Extended (PCI-X) interface, a high-speed PCI-Express (PCIe) interface, another industry standard or proprietary communication interface, or a combination thereof. I/O interface 410 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. BIOS/UEFI module 440 includes BIOS/UEFI code operable to detect resources within information handling system 400, to provide drivers for the resources, initialize the resources, and access the resources. BIOS/UEFI module 440 includes code that operates to detect resources within information handling system 400, to provide drivers for the resources, to initialize the resources, and to access the resources.

Disk controller 450 includes a disk interface 452 that connects the disk controller to HDD 454, to ODD 456, and to disk emulator 460. An example of disk interface 452 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 460 permits SSD 464 to be connected to information handling system 400 via an external interface 462. An example of external interface 462 includes a USB interface, an IEEE 1394 (Firewire) interface, a proprietary interface, or a combination thereof. Alternatively, solid-state drive 464 can be disposed within information handling system 400.

I/O bridge 470 includes a peripheral interface 472 that connects the I/O bridge to add-on resource 474, to TPM 476, and to network interface 480. Peripheral interface 472 can be the same type of interface as I/O channel 412, or can be a different type of interface. As such, I/O bridge 470 extends the capacity of I/O channel 412 when peripheral interface 472 and the I/O channel are of the same type, and the I/O bridge translates information from a format suitable to the I/O channel to a format suitable to the peripheral channel 472 when they are of a different type. Add-on resource 474 can include a data storage system, an additional graphics interface, a network interface card (NIC), a sound/video processing card, another add-on resource, or a combination thereof. Add-on resource 474 can be on a main circuit board, on separate circuit board or add-in card disposed within information handling system 400, a device that is external to the information handling system, or a combination thereof.

Network interface 480 represents a NIC disposed within information handling system 400, on a main circuit board of the information handling system, integrated onto another component such as I/O interface 410, in another suitable location, or a combination thereof. Network interface device 480 includes network channels 482 and 484 that provide interfaces to devices that are external to information handling system 400. In a particular embodiment, network channels 482 and 484 are of a different type than peripheral channel 472 and network interface 480 translates information from a format suitable to the peripheral channel to a format suitable to external devices. An example of network channels 482 and 484 includes InfiniBand channels, Fibre Channel channels, Gigabit Ethernet channels, proprietary channel architectures, or a combination thereof. Network channels 482 and 484 can be connected to external network resources (not illustrated). The network resource can include another information handling system, a data storage system, another network, a grid management system, another suitable resource, or a combination thereof.

Management device 490 represents one or more processing devices, such as a dedicated baseboard management controller (BMC) System-on-a-Chip (SoC) device, one or more associated memory devices, one or more network interface devices, a complex programmable logic device (CPLD), and the like, that operate together to provide the management environment for information handling system 400. In particular, management device 490 is connected to various components of the host environment via various internal communication interfaces, such as a Low Pin Count (LPC) interface, an Inter-Integrated-Circuit (I2C) interface, a PCIe interface, or the like, to provide an out-of-band (OOB) mechanism to retrieve information related to the operation of the host environment, to provide BIOS/UEFI or system firmware updates, to manage non-processing components of information handling system 400, such as system cooling fans and power supplies. Management device 490 can include a network connection to an external management system, and the management device can communicate with the management system to report status information for information handling system 400, to receive BIOS/UEFI or system firmware updates, or to perform other task for managing and controlling the operation of information handling system 400. Management device 490 can operate off of a separate power plane from the components of the host environment so that the management device receives power to manage information handling system 400 when the information handling system is otherwise shut down. An example of management device 490 include a commercially available BMC product or other device that operates in accordance with an Intelligent Platform Management Initiative (IPMI) specification, a Web Services Management (WSMan) interface, a Redfish Application Programming Interface (API), another Distributed Management Task Force (DMTF), or other management standard, and can include an Integrated Dell Remote Access Controller (iDRAC), an Embedded Controller (EC), or the like. Management device 490 may further include associated memory devices, logic devices, security devices, or the like, as needed or desired.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A trans-inductor voltage regulator (TLVR), comprising:
   at least two voltage converter phases, each phase configured to receive a common input voltage and to provide an output voltage on an output of the voltage converter;
   for each voltage converter phase, an associated coupled inductor including a primary winding and a secondary winding, the coupled inductor being magnetically coupled together, wherein for each primary winding, a first terminal of the primary winding is coupled to the output of the associated voltage converter, and a second terminal of the primary winding is coupled to a load; and
   a compensation inductor, wherein a first terminal of the compensation inductor is coupled to a ground plane, each secondary winding being coupled in series with the compensation inductor, a last in series secondary winding being coupled to the ground plane, and wherein the compensation inductor is a nonlinear inductor exhibiting a first inductance level at a first current level, and a second inductance level different from the first inductance level at a second current level different from the first current level.

2. The TLVR of claim 1, wherein the first inductance level is a higher inductance level than the second inductance level.

3. The TLVR of claim 2, wherein the first current level is a lower current level than the second current level.

4. The TLVR of claim 3, wherein the first inductance level is substantially equal to 600 nanoHenries (nH).

5. The TLVR of claim 4, wherein the second inductance level is substantially equal to 200 nH.

6. The TLVR of claim 1, wherein each coupled inductor is magnetically coupled together with a coupling coefficient of not less than 0.95.

7. The TLVR of claim 1, wherein, when a current level in a load is lower than a threshold, one or more of the converter phases are disabled, leaving at least one of the converter phases enabled to satisfy the current level demanded by the load.

8. The TLVR of claim 7, wherein, when the current level is lower than the threshold, the compensation inductor operates at the first inductance level.

9. The TLVR of claim 8, wherein, when the current level is higher than the threshold, the compensation inductor operates at the second inductance level.

10. The TLVR of claim 1, wherein the compensation inductor exhibits the first and second inductance levels based upon a nonlinear core due to at least one of the magnetic properties of the core, a non-uniformity of the core material, and a different core dimension.

11. A method comprising:
    providing at least two voltage converter phases of a trans-inductor voltage regulator (TLVR) with a common input voltage;
    coupling an output of each converter phase to a first terminal of a primary winding of an coupled inductor of the TLVR, each coupled inductor including a secondary winding magnetically coupled to the primary winding;
    for each primary winding, coupling a second terminal of the primary winding to a load;

coupling a first terminal of a compensation inductor of the TLVR to a ground plane, wherein the compensation inductor is a nonlinear inductor exhibiting a first inductance level at a first current level, and a second inductance level different from the first inductance level at a second current level different from the first current level;

coupling each secondary winding in series with the compensation inductor; and coupling a last in series secondary winding to the ground plane.

12. The method of claim 11, wherein the first inductance level is a higher inductance level than the second inductance level.

13. The method of claim 12, wherein the first current level is a lower current level than the second current level.

14. The method of claim 13, wherein the first inductance level is substantially equal to 600 nanoHenries (nH).

15. The method of claim 14, wherein the second inductance level is substantially equal to 200 nH.

16. The method of claim 11, wherein each coupled inductor is magnetically coupled together with a coupling coefficient of not less than 0.95.

17. The method of claim 11, further comprising disabling one or more of the converter phases and leaving at least one of the converter phases enabled to satisfy the load when the current level demanded by the load is lower than a threshold.

18. The method of claim 17, wherein, when the current level is lower than the threshold, the compensation inductor operates at the first inductance level.

19. The method of claim 18, wherein, when the current level is higher than the threshold, the compensation inductor operates at the second inductance level.

20. An information handling system, comprising:

a load; and a trans-inductor voltage regulator (TLVR) including:

at least two voltage converter phases, each phase configured to receive a common input voltage and to provide an output voltage on an output of the voltage converter;

for each voltage converter phase, an associated coupled inductor including a primary winding and a secondary winding, the coupled inductor being magnetically coupled together, wherein for each primary winding, a first terminal of the primary winding is coupled to the output of the associated voltage converter, and a second terminal of the primary winding is coupled to the load; and a compensation inductor, wherein a first terminal of the compensation inductor is coupled to a ground plane, each secondary winding being coupled in series with the compensation inductor, a last in series secondary winding being coupled to the ground plane, and wherein the compensation inductor is a nonlinear inductor exhibiting a first inductance level at a first current level, and a second inductance level different from the first inductance level at a second current level different from the first current level.

* * * * *